United States Patent [19]

Meeker

[11] Patent Number: 4,826,246
[45] Date of Patent: May 2, 1989

[54] CHILD SAFETY SEAT

[75] Inventor: Paul K. Meeker, Aurora, Ohio

[73] Assignee: Spalding & Evenflo Companies, Inc., Tampa, Fla.

[21] Appl. No.: 81,193

[22] Filed: Aug. 4, 1987

[51] Int. Cl.⁴ .............................................. A47D 1/10
[52] U.S. Cl. .................................... 257/250; 297/216
[58] Field of Search ............... 297/250, 216, 468, 469, 297/483, 486, 487, 488

[56] References Cited

U.S. PATENT DOCUMENTS

| | | | |
|---|---|---|---|
| 3,948,556 | 4/1976 | Hyde et al. | 297/250 |
| 4,274,674 | 6/1981 | Deloustal | 297/250 |
| 4,339,149 | 7/1982 | Nakao et al. | 297/216 X |
| 4,348,048 | 9/1982 | Thevenot | 297/250 |
| 4,545,613 | 10/1985 | Martel et al. | 297/250 |
| 4,688,849 | 8/1987 | Tsuge et al. | 297/250 |

FOREIGN PATENT DOCUMENTS 2347010  8/1976  France ................. 297/216

*Primary Examiner*—Peter A. Aschenbrenner
*Attorney, Agent, or Firm*—Donald R. Bahr

[57] ABSTRACT

An improved child safety seat coupleable to the seat of a car through a three-point safety belt with restraining means to hold a child therein. The safety seat has a U-shaped tube with an upper horizontal leg and spaced downwardly extending vertical legs. The tube is secured to the rear face of the back of the safety seat in spaced relationship therewith whereby the a three-point safety belt may be located with its horizontal lap belt in contact with the vertical legs beneath the midpoint of the safety seat and with its transverse shoulder belt in contact with the horizontal leg above the midpoint of the safety seat. This relationship of components will securely hold the child safety seat with respect to the car seat in which it is utilized. The safety seat is also rotationally adjustable and includes a child restraining assembly operatively associated therewith so that adjustment of the rotational position of the safety seat will not vary the tension force of the restraining assembly on a child in the safety seat.

11 Claims, 7 Drawing Sheets

CHILD SAFETY SEAT

BACKGROUND OF THE INVENTION

1. Field of the Invention

The present invention relates to child safety seats of the type used in vehicles and, more particularly, to a child safety seat to safely, conveniently and comfortably restrain a child in a car in the event of a sudden stop or turn, collision or other emergency.

2. Description of the Prior Art

Vehicles, such as cars, are presently equipped with occupant restraining seat belts installed by the manufacturers of the cars. While such seat belts are adequate for restraining adults in the event of a sudden stop or turn, collision, or other emergency, most are inadequate for protecting children. As a result, a variety of specially designed child restraint devices have been designed and developed and are in widespread use today.

The child restraint device of this invention is an improvement over the prior art. The most commonly employed child restraint device includes a specially designed safety seat which rests on the car seat and which is secured in place by either the seat belts of the cars and/or by special belts. An associated array of straps secures the child to the safety seat. Such straps may include a horizontal waist strap, a vertical crotch strap and a pair of vertical shoulder straps. Because children vary considerably in size as they grow from infancy, the strap portion of the child safety seat is generally adjustable through a wide range of sizes to accommodate the particular child using the seat. Furthermore, many of the present strap arrays are relatively complicated to utilize because of the number and orientation of the belt sections utilized and adjustment features which they may incorporate. Their general inefficiency and complexity renders them difficult to install in a car and difficult for the placement and removal of a child. As a result their use is, unfortunately, often neglected.

Child safety seats have been secured to the seats of cars through various techniques which can be illustrated by reviewing the patent literature. By way of example, U.S. Pat. No. 3,938,859 to Henderson discloses a child safety seat secured to a car seat by the older style lap belt which functions to hold both the child and the safety seat in position during use. Such an arrangement was considered acceptable in its time. Such type of device, however, restrained the child and safety seat in a low position on the safety seat which, unfortunately, allowed for the forward tipping of the child and safety seat upon the occurrence of a sudden stop or turn, collision, or other emergency.

A partial solution to this problem is disclosed in U.S. Patent Number 3,563,600 to Converse which supplements the support provided by the lap belt with an additional strap releasably secured to a hook formed in the top of the safety seat. The additional strap is secured vertically around the back portion of the car seat. While such an arrangement assists in minimizing the forward tipping of the child safety seat, it is cumbersome to install and use and is no longer a viable alternative in view of the three-point safety-belt systems found in cars today.

A three-point safety belt system is formed of two belts secured to the car at three points. The two belts are coupled together at one end for releasable securement by the wearer to a buckle at a first fixed point on the car seat adjacent to the wearer. The lower belt is the horizontal lap belt extending over the wearer's lap to an adjacent second fixed point. The second or shoulder belt extends transversely from the buckle, angling upwardly across the wearer's chest and shoulder, to an elevated fixed third point.

Presently utilized child safety seats designed for securement by three-point safety belts generally secure only the lower portions of the child safety seat to the car seat. A representative arrangement is shown in U.S. Pat. No. 4,613,188 to Tsuge. According to the Tsuge disclosure, the three-point seat belt is fitted partially above and partially below the child in the safety seat. In other known safety seat systems, the three-point safety belt may be threaded through an arrangement of safety seat parts between the back of the safety seat and the front of the car seat. All such known arrangements for coupling child safety seats to car seats, however, secure only the lowermost regions of the child safety seat rendering both the coupled safety seat and child susceptible to forward tipping along with the potential for attendant harm to the child.

An optimum child safety seat would be something new which combines the benefits of the prior approaches without their shortcomings, i.e., a child safety seat which provides for improved safety of a child secured therein to preclude potentially harmful movement of the child and/or safety seat in the event of a sudden stop or turn, collision or other emergency which provides for improved user conveience during the installing of the safety seat to the seat of a car and during the placing of the child in the safety seat as well as during his or her removal therefrom to preclude avoiding the use of the safety seat due to its inconvenience and which provides for the comfort of the child in the safety seat due to its ability to be angularly repositioned without varying the tension forces of the restraining belts on the child.

As illustrated by the great number of prior patents and commercial devices, efforts are continuously being made in an attempt to more safely, conveniently and comfortably secure a child to a car seat through an improved safety seat and existing seat belt arrangements. None of these prior efforts, however, suggests the present inventive combination of component elements arranged and configured for the efficient solution of this problem as disclosed and claimed herein. Prior devices do not provide the benefits of the present invention which achieves its intended purposes, objectives and advantages over the prior art devices through a new, useful and unobvious combination of component elements, through no increase in the number of functioning parts, at a minimum of cost and through the utilization of only readily available materials and conventional components.

Therefore, it is an object of the present invention to provide a child safety seat which includes improved retaining components to better secure the safety seat to the seat of a car through a three-point seat belt at spaced upper and lower points thereby preclude tipping of the safety seat and injury to the child in the event of a sudden stop or turn, collision or other emergency and which also includes improved restraining components for greater comfort of the child in the safety seat whereby the angular position of the safety seat may be adjusted with respect to the seat of the car in which it is secured without varying the force of the restraining straps on the child.

It is a further object of the invention to improve the safety of child safety seats by precluding injury to a child seated in such a safety seat as caused by inadvertent tipping of the safety seat and child in the event of a sudden stop or turn, collision or other emergency.

It is yet a further object of the invention to improve the convenience of using a child safety seat, during the installing of the safety seat to the seat of a car through a standard three-point seat belt and during the placing of the child in the safety seat as well as during his or her removal to thereby preclude neglecting the use of the safety seat due to any possible inconvenience.

Lastly, it is yet an object of the invention to improve the comfort of child safety seats by allowing the angular position of the safety seat to be adjusted with respect to the seat of the car in which it is secured without varying the force of the restraining straps on the child in the safety seat.

These objects and advantages should be construed as merely illustrative of some of the more prominent features and applications of the present invention. Many other beneficial results can be obtained by applying the disclosed invention in a different manner or by modifying the invention within the scope of the disclosure. Accordingly, other objects and advantages as well as a fuller understanding of the invention may be had by referring to the summary and detailed description of the preferred embodiment of the invention in addition to the scope of the invention as defined by the claims taken in conjunction with the accompanying drawings.

SUMMARY OF THE INVENTION

The present invention is defined by the appended claims with the specific preferred embodiment shown in the attached drawings. For the purposes of summarizing the invention, the invention may be incorporated into an improved child safety seat for use in association with the seat of a car having a three-point safety belt. The safety seat comprises a seat portion, restraining means operatively coupled with the seat portion for restraining a child in the seat portion and retaining means. The retaining means is secured with respect to the rear face of the seat portion in spaced relationship therewith and adapted to receive, at a lower extent, the horizontal lap belt of the three-point safety belt and, at a higher extent, the transverse shoulder belt of the three-point safety belt for thereby securely holding the seat portion and child with respect to the seat of the car in which it is utilized. The retaining means includes an inverted U-shaped member having a horizontal leg and vertical legs coupled at their upper ends with the horizontal leg. The retaining means also includes spacer means coupling the central portion of the horizontal leg with the rear face of the seat portion in spaced relationship whereby a three-point safety belt may be located with its horizontal lap belt in contact with the vertical legs beneath the midpoint of the child safety seat and with its transverse shoulder belt in contact with the horizontal leg above the midpoint of the child safety seat to thereby securely hold the safety seat and child against tipping with respect to the car seat in which it is utilized. The child safety seat further includes a support tube secured to the seat portion parallel with the horizontal leg with the frame of the seat portion therebetween. Further included is bracket means securing the support rod and the horizontal leg with respect to each other and with respect to the frame of the seat portion. The child safety seat further includes means coupling the lower ends of the vertical legs with respect to the lower extent of the seat portion.

The invention may further be incorporated into an improved child safety seat for use in association with the seat of a car having a seat belt. The safety seat comprises a seat portion, a base portion and pivot means coupling the seat portion and the base portion for allowing rotational movement of the seat portion with respect to the base portion about the axis of the pivot means. The safety seat also includes restraining means for a child in the seat portion with the upper end of the restraining means releasably coupleable to a forward region of the seat portion. The restraining means extends upwardly therefrom for contacting the child seated in the seat portion. The restraining means then extends around an upper region of the seat portion and then downwardly behind the back of the seat portion in contact with and around the pivot means. It is then adjustably coupleable at its lower end to a forward region of the base portion whereby the force of the restraining means on the child in the seat portion will not vary with the angular position of the seat portion with respect to the base portion. Also included is retaining means coupled to the seat portion to secure the seat portion to the seat of the car in which it is utilized through the safety belt of the car. The child safety seat further includes upper latch means in the forward region of the seat portion for releasably receiving the upper end of the restraining means and a lower latch means in the forward region of the base portion for adjustably receiving the lower end of the restraining means. The restraining means includes a strap means and a rigid plate, the lower end of which is positionable in the upper latch means for releasably coupling therewith, and the upper end of which is secured to the strap means. The strap means includes a pair of shoulder straps positionable over the shoulders of a child in the seat portion. The strap means further includes a single strap coupled at one end to the pair of straps through a slotted plate with the other end of the single strap being receivable by the lower latch.

Lastly, the invention may be incorporated into a child safety seat for use in association with the seat of a car having a three-point safety belt. The safety seat comprises a seat portion, a base portion and pivot means rotatively coupling the seat portion to the base portion for allowing movement of the seat portion with respect to the base portion about the axis of the pivot means. Locking means are also provided for locking the seat portion to the base portion in any one of a plurality of angular positions. Restraining means are also provided for a child in the seat portion with one end of the restraining means releasably coupleable to a forward region of the seat portion and extending upwardly therefrom for contacting the child seated in the seat portion. The restraining means then extends around an upper region of the seat portion and then downwardly behind the seat portion in contact with and around the pivot means. It is then adjustably coupleable to a forward region of the base portion whereby the force of the restraining means on the child will not vary with the angular position of the seat portion with respect to the base portion. An inverted U-shaped tube having vertical legs coupled at their lower ends to the pivot means and joined at their upper ends with a horizontal leg is also included. Lastly, spacer means are included for coupling the central portion of the horizontal leg with the rear face of the seat portion in spaced relationship whereby a three-point safety belt may be located with its horizontal lap belt in contact with the vertical legs beneath the midpoint of the child safety seat and with its transverse shoulder belt in contact with the horizontal leg above the midpoint of the child safety seat to thereby securely hold the child safety seat with respect to the car seat in which it is utilized.

The foregoing has outlined rather broadly the more pertinent and important features of the present invention in order that the detailed description of the invention that follows may be better understood whereby the present contribution to the art may be more fully appreciated. Additional features of the invention will be described hereinafter which form the subject of the claims of the present invention. It should be appreciated by those skilled in the art that the conception and the specific embodiment disclosed herein may be readily utilized as a basis for modifying or designing other apparatus for carrying out the same purposes of the present invention. It should also be realized by those skilled in the art that such equivalent apparatus does not depart from the spirit and scope of the invention as set forth in the appended claims.

BRIEF DESCRIPTION OF THE DRAWINGS

For a more complete understanding of the nature, objects and advantages of the present invention, reference should be had to the following detailed description taken in conjunction with the accompanying drawings in which.

Similar numerals refer to similar parts throughout the various figures.

DETAILED DESCRIPTION OF THE INVENTION

Figure 1:
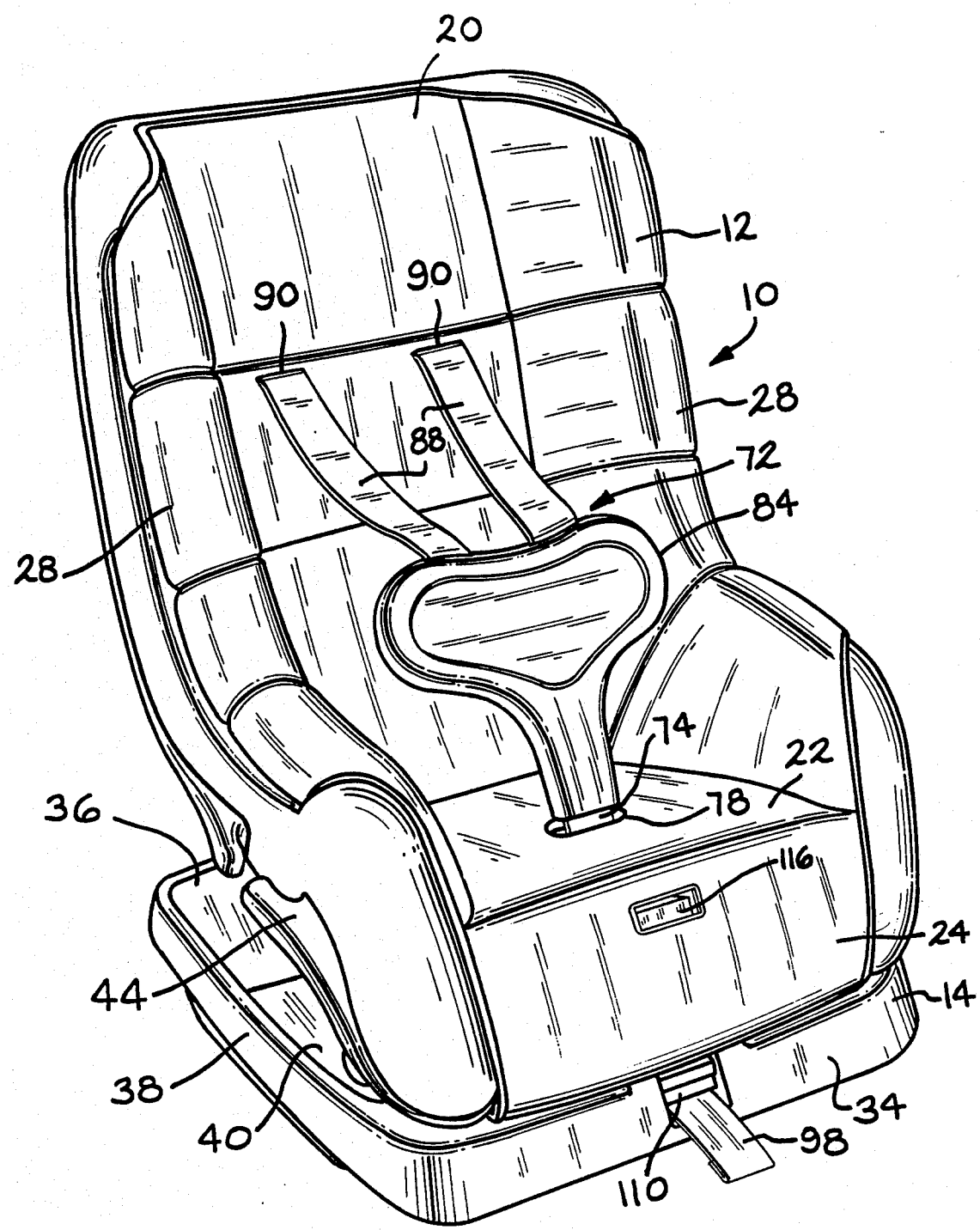
FIG. 1 is a perspective illustration of a child safety seat constructed in accordance with the principles of the present invention.
Figure 2:
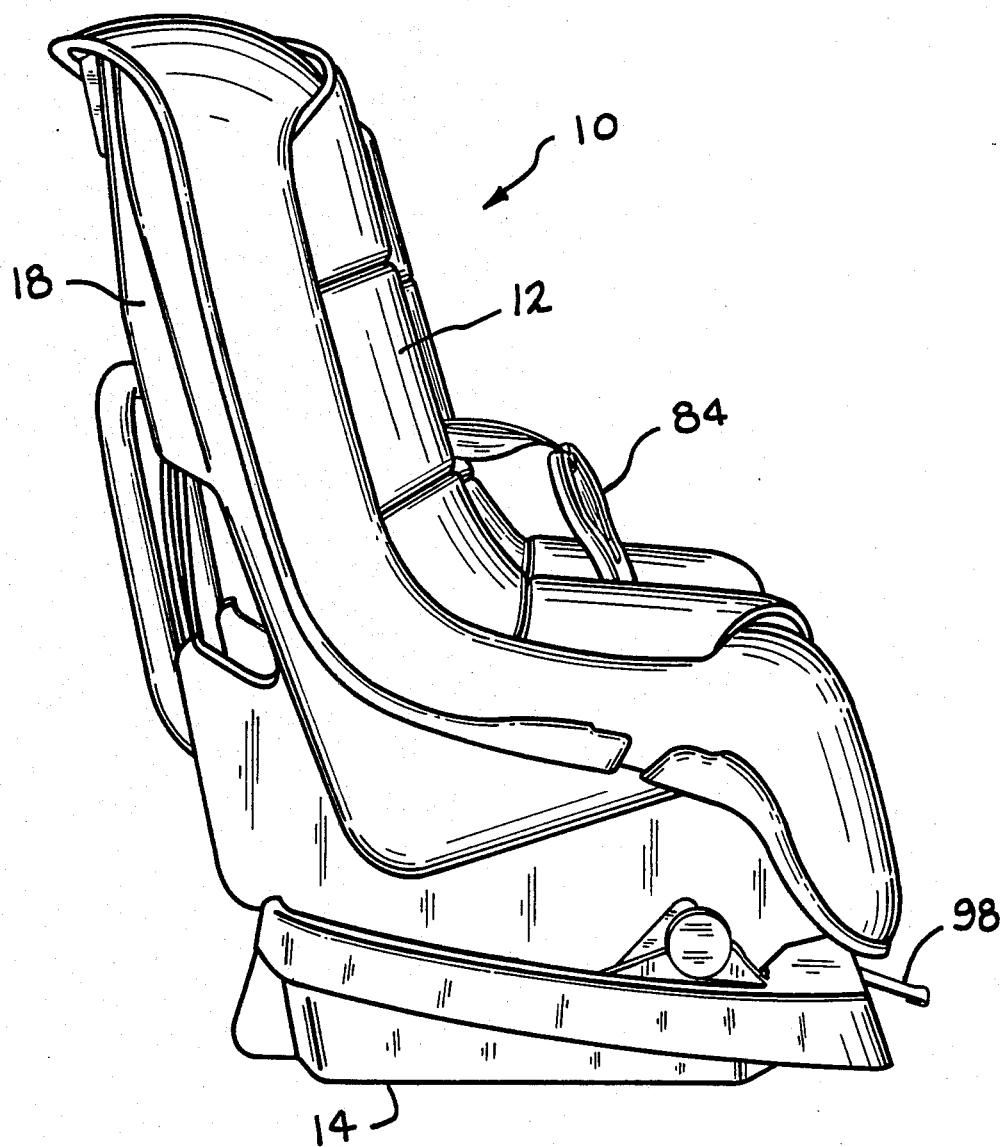
FIG. 2 is a right-hand side elevational view of the child safety seat a shown in FIG. 1.
Figure 3:
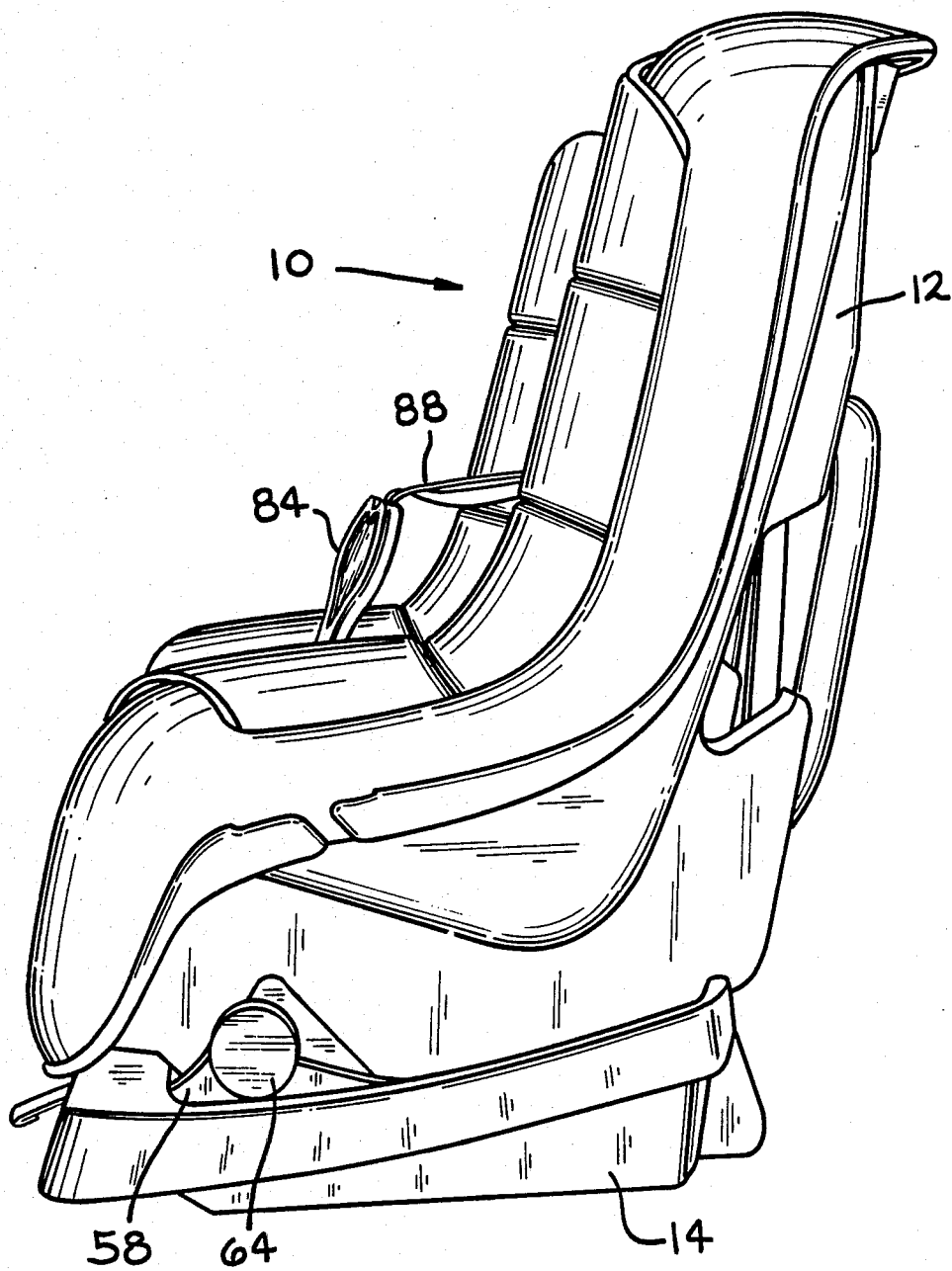
FIG. 3 is a left-hand side elevational view of the child safety seat as shown in FIG. 1 and 2.
Figure 4:
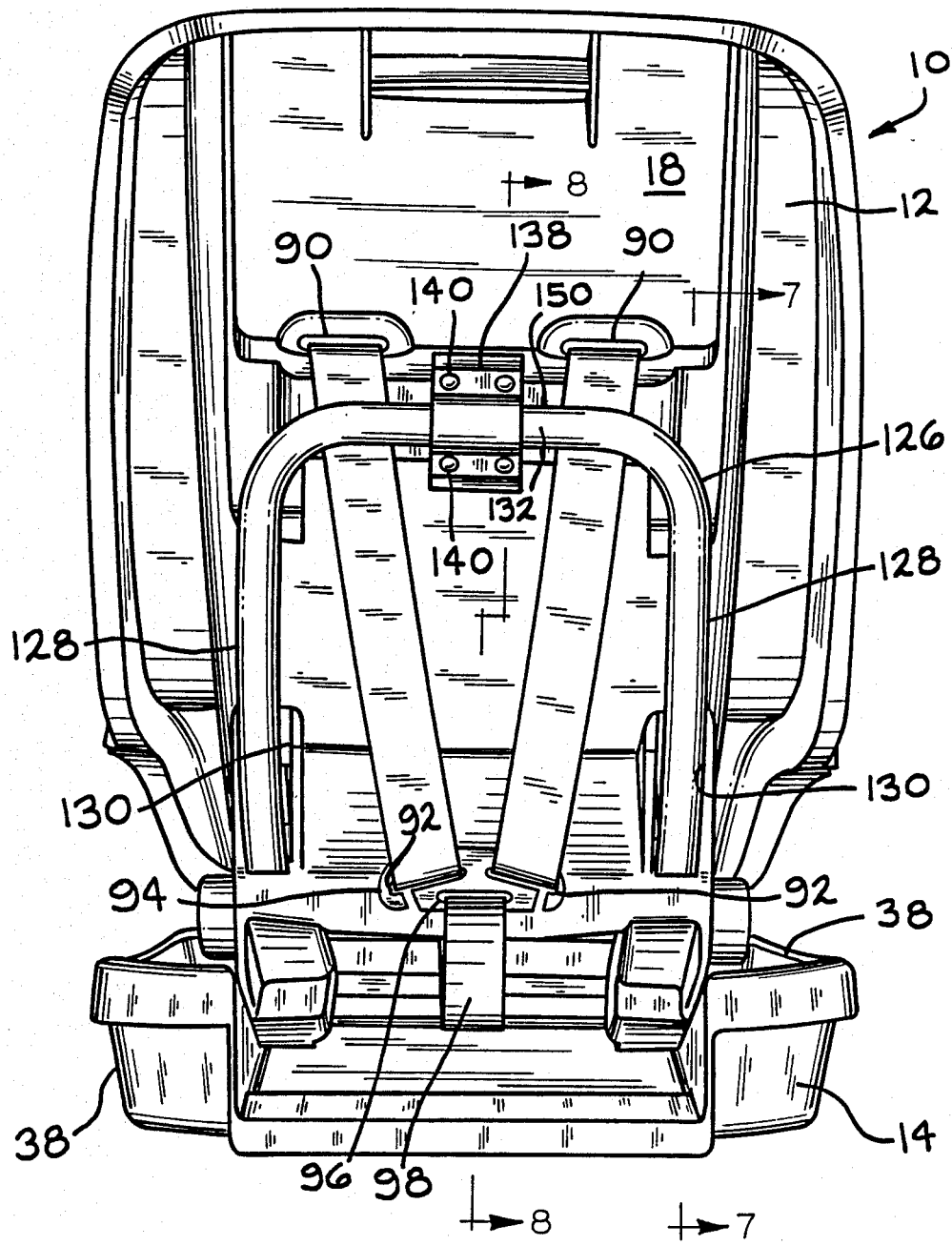
FIG. 4 is a rear elevational view of the child safety seat as shown in the previous figures.
Figure 7:
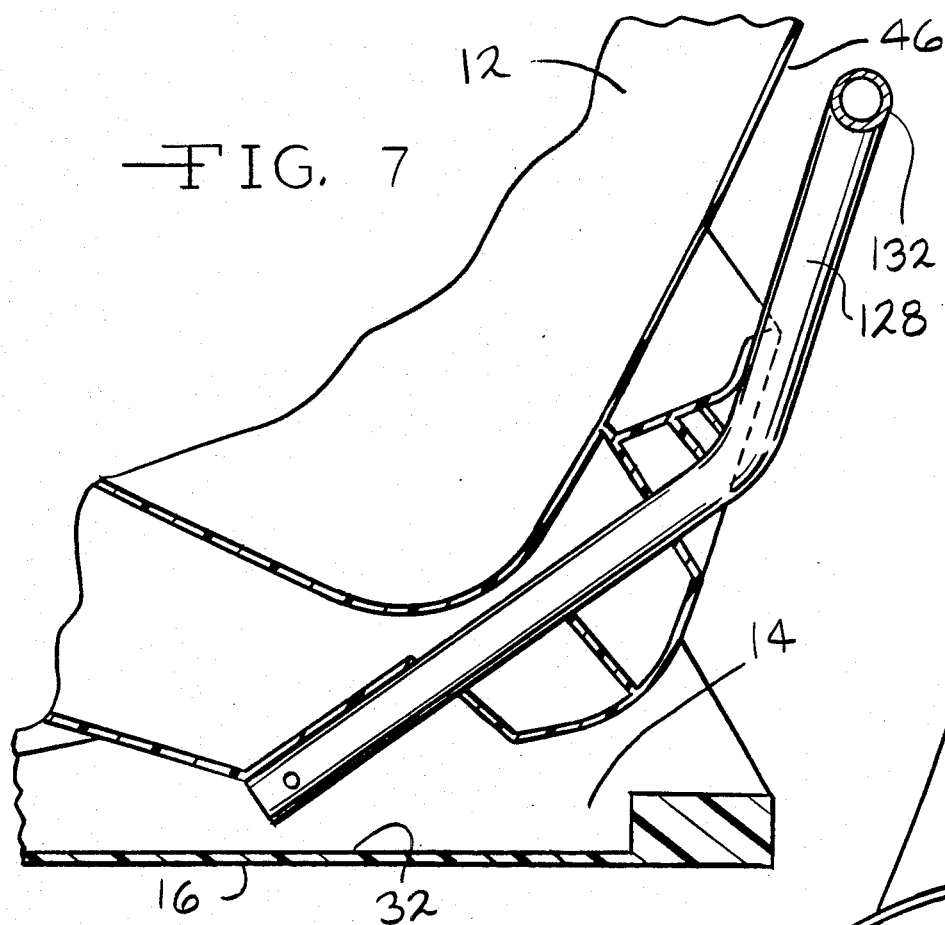
FIG. 7 and 8 are enlarged, partial sectional views of the lower rear portion of the child safety seat taken along lines 7—7 and 8—8 of FIG. 4 but with the padding removed.

As can be seen in FIG. 1, 2 and 7 the child safety seat 10 of the present invention is formed with two major portions, the upper or seat portion 12 in which the child is seated in a restrained fashion, and a lower or base portion 14 to which the seat portion is pivotally coupled. The lower face 16 of the base portion 14 is adapted to be positioned upon the generally horizontal seating surface of a car seat while the rear face 18 of the seat portion 12 is adapted to be positioned adjacent to the generally vertical back supporting surface of a car seat.

The seat portion 12 includes a central seat part 22, generally horizontal in its orientation upon which a child may sit, with a vertical, downwardly projecting, front part 24 extending from the front edge thereof. Vertically extending upwardly from the rear edge of the seat part 22 is a back part 26 for supporting the back of the child. Side parts 28 extend vertically forward adjacent to the back part 26 and seat part 22 and front part 24 are employed to minimize sideways shifting of the child in the event of a sudden turn by the car, a sideways collision, or the like, or simply to further assist in restraining the child in the intended position.

The base portion 14 of the child safety seat 10 has a generally rectangular lower base plate 32 with upstanding front, back and side walls 34, 36 and 38 forming a cavity 40 for receiving the lower extents of the seat portion 12. In addition, an insert plate 44 is provided on each side of the child safety seat in the region where the seat portion and base portion are coupled. The insert plates 44 are secured to, and are upstanding from, the base plate 32 of the base portion 14 and preclude someone from inadvertently placing a finger or hand between the seat portion and base portion. Such inadvertent placing of a finger or hand might result in injury if the insert plates were not so provided.

The seat portion 12, the base portion 14 and insert plates 44 are preferably fabricated with a frame 46 of a rigid, impact resistant material, such as a molded thermoplastic resin. The surfaces of the seat portion frame and base portion frame are then covered with an elastomeric foam 48 and an exterior cover 50, all for the safety and comfort of the child restrained in the safety seat. All exposed exterior surfaces of the safety seat are preferably so padded and covered except that the rear face 18 of the seat portion 12 and the lower face 16 of the base portion 14 need not be so padded and covered since they are not visible to a viewer nor contactable by the child.

Figure 5:
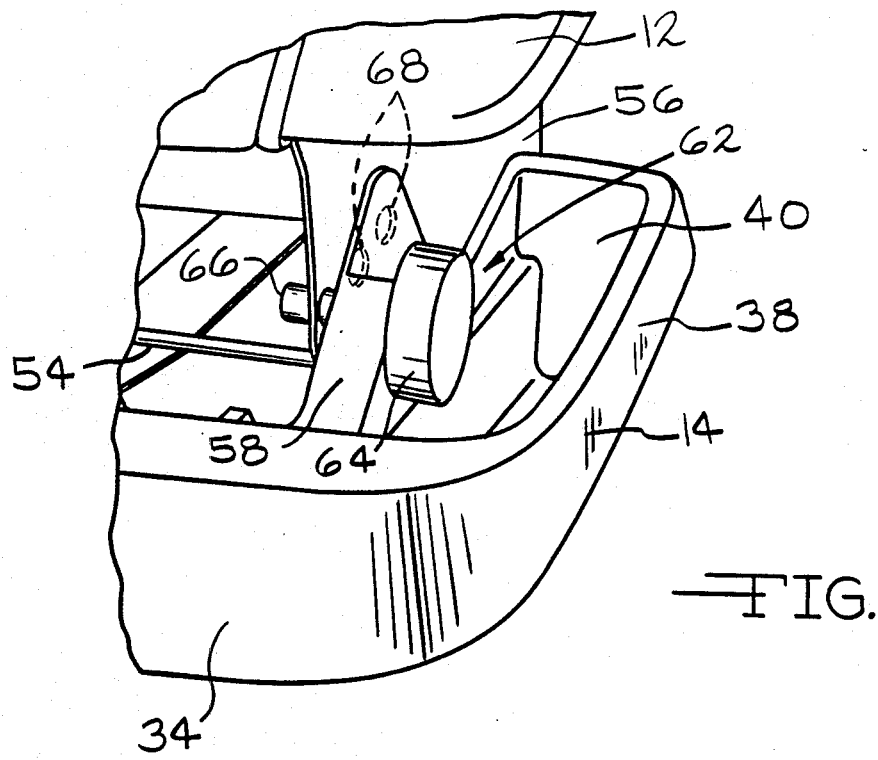
FIG. 5 is an enlarged perspective illustration of the lower front left portion of the child safety seat shown in the previous figures and illustrating the adjustment mechanisms.
Figure 6:
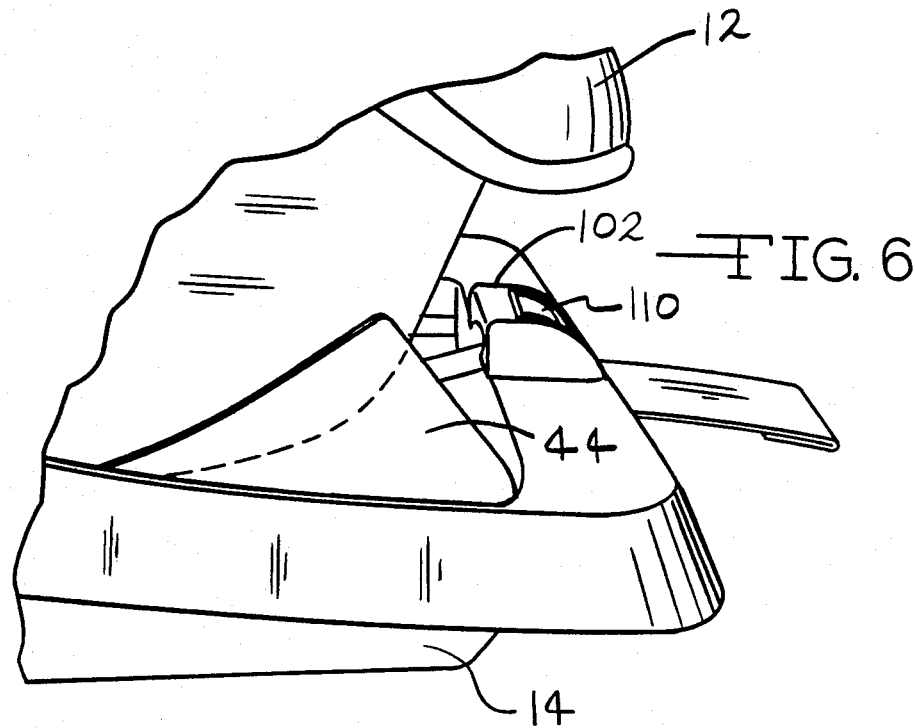
FIG. 6 is an enlarged perspective illustration of the lower front right portion of the safety seat shown in the previous figures and illustrating the adjustable strap retaining mechanism.

As is shown in FIG. 5, the coupling of the seat portion and base portion is effected through a rigid pivot rod 54 extending nearly the width of the child safety seat. The pivot rod extends through aperatures in downwardly projecting extensions 56 on opposite sides of the seat portion. The pivot rod extends outwardly from the apertures in the seat portion extensions through apertures in fixed, upwardly projecting extension 58 on opposite sides of the base portion 14. In this manner, the rod and base portion will be fixedly positioned while the seat portion may be rotated forwardly and rearwardly with respect to the axis of the pivot rod which is also the axis of the apertures of the extensions through which the pivot rod passes.

Inadvertent pivoting of the seat portion with respect to the base portion is precluded by like latch assemblies 62 located adjacent to each end of the pivot rod 54. As can be particularly seen in FIG. 5, each latch assembly includes a handle 64 axially mounted and shiftable within an aperture of each upwardly projecting extension 58 of the base portion 14. Each handle includes an inwardly directed pin 66 with coil spring biasing means tending to urge the handle and its pin inwardly. Such type of latch assembly is conventional and well known in the mechanical arts. A plurality of locating apertures 68 are formed in the downwardly projecting extensions of the seat portion. The locating apertures 68 are located at a common distance from the axis of rotation of the pivot rod 54 along a curve whereby the handles 64 may be withdrawn against the action of their springs, the seat portion 12 rotated to a new angular orientation and the handles 64 released so that their pins may be located through any preselected locating apertures 68. In this manner the seat portion 12 may be selectively positioned at any one of a plurality of angular orientations as determined by the position of the seat portion 12 and the location apertures 68. The withdrawing and release of the handles 64 on both sides of the base portion 14 must be done in a coordinated manner to effect the proper repositioning to prevent inadvertent adjustment and for additional strength.

Figure 8:
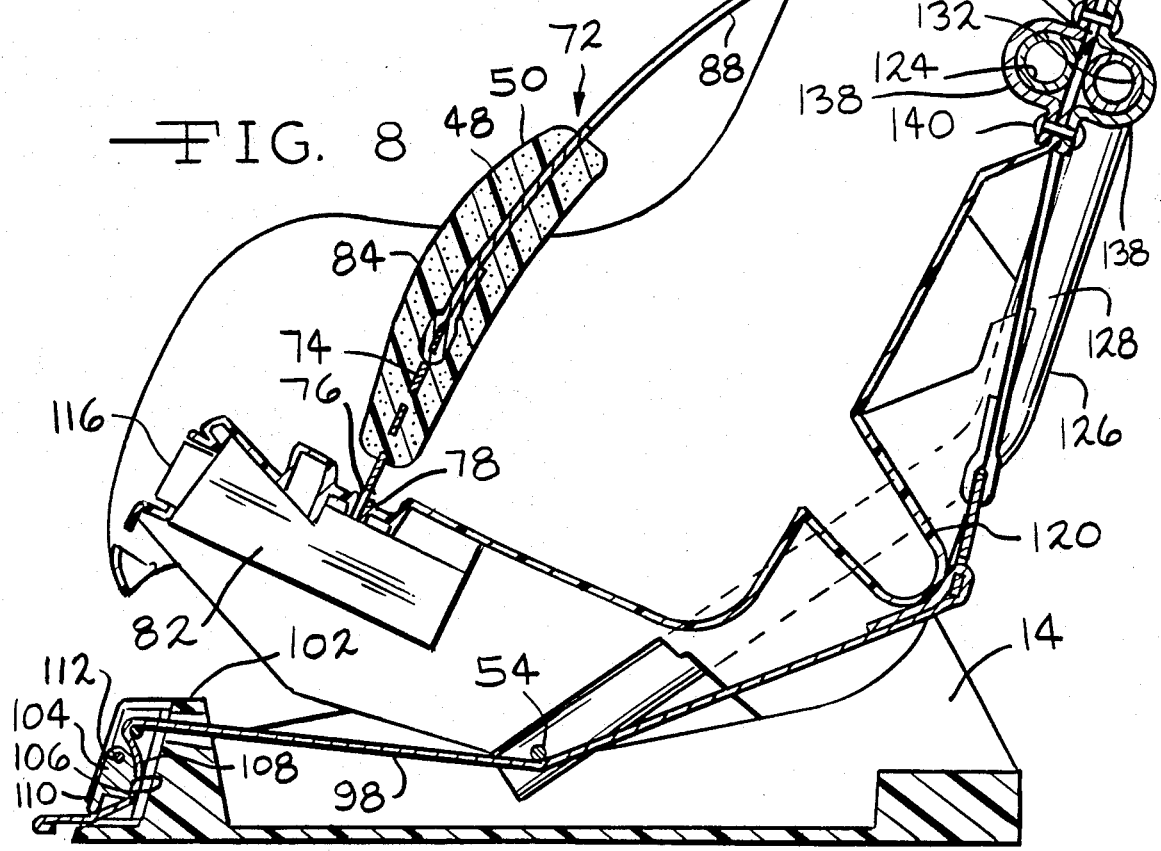
Figure 9:
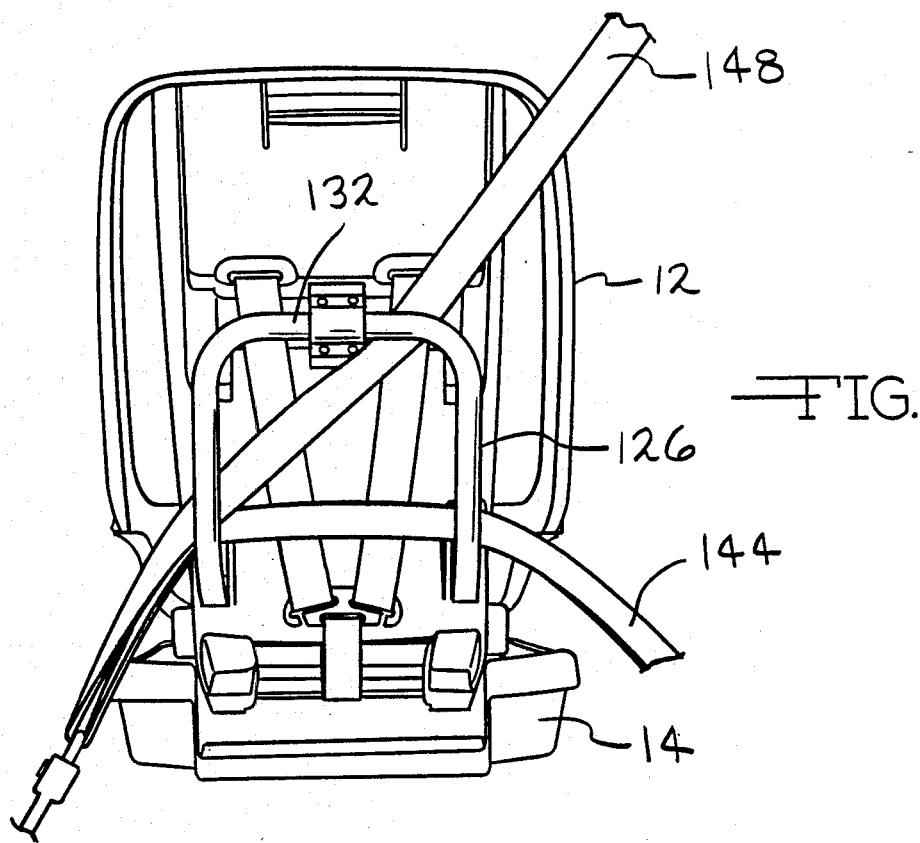
FIG. 9 is rear elevational view similar to the showing of FIG. 4 but illustrating the coupling of the child safety seat with a three-point safety belt.

As can be seen from FIGS. 1 and 8, securement and restraint of the child is effected by a restraining assembly 72 which includes an array of flexible straps with mechanisms provided therewith on the opposite ends of the straps for releasably securing the straps with respect to each other as well as with respect to the seat portion 12 and base portion 14. The first or upper end of the restraining assembly 72 includes a metallic plate 74 with an aperture 76 at its lower end selectively positionable into a slot 78 of the seat part 22 whereby it may be releasably received by an upper latch 82. The upper end of the plate 74 is enlarged broadening out to an oval configuration to constitute a shield 84 for the child restrained in the safety seat. The majority of the plate 74, except for its lower end which is insertable in the slot 78, is provided with foam and a cover in a manner similar to the seat portion, base portion and inserts. The lower end of the plate is not so covered since, during use, it will be within the seat part slot and not contactable by the child in the safety seat. The lower part of the plate is positionable between the legs of a child in the safety seat and functions as a crotch protector while the upper enlarged part of the plate functions as an abdomen and chest protector.

The upper end of the plate is fixedly secured to a pair of laterally disposed, inextensible, flexible straps 88 which extend upwardly over the shoulders of the child and through apertures 90 in an upper extent of the upper or back part 26 of the seat portion 12. These two straps 88 then turn downwardly where they are fixedly received by spaced apart upper slots 92 in a coupling plate 94. Extending downwardly from a central, lower slot 96 in the coupling plate 94 is a single strap 98 which is trained beneath, and in contact with, the pivot rod 54 and then through an adjustable lower latch 102 at the forward region of the base portion 14.

As can be most clearly seen in FIG. 8, the lower latch 102 includes a spring biased rotatable bearing member 104 urged into contact with the belt 98 adjacent its lower end. The serrated surface 106 of the bearing member 104 urges the belt into fixed contact with a fixed backing surface 108 of the latch 102 to releasably secure the belt in proper position. Manually pivoting the bearing member 104 by pulling the latch 110 outwardly about its axis pin 112 relieves the holding pressure and allows the lower strap 98 to be repositioned inwardly or outwardly as a function of the size of child to be restrained in the safety seat. A secure but not overly tight restraint of the child is preferred. Release of the latch 110 will cause the spring to urge the serrated surface 106 into locking engagement with the strap 98 previously set in position by the user.

The upper end of the restraining assembly 72 need not be provided with adjustment capabilities since the aperture 76 free end of the plate 74 will be fixedly positioned in the central seat part slot 78 adjacent to the forward region of the central seat part 22. A button 116 on the front part of the seat portion 12 is spring urged outwardly so that the pressing of the button 116 will disengage the aperture 76 of the plate 74 and thus allow the user to withdraw the plate 74 from the slot 78 for placing the child into the safety seat 10 or for withdrawing the child therefrom. The upper latch 82 for the plate 74 is conventional in construction and allows the plate 74 to simply lock upon its insertion in the slot 78 but requires a positive pressing of the button 116 to effect its release. The positioning of the button 116 on the front part 24 of the seat portion 12 precludes inadvertent contact by the child along with inadvertent release of the restraining assembly 72.

The rigid frame 46 of the seat portion 12 includes two convex projections 120 and 122. The lower convex projection 120 is located to contact the strap 98 adjacent the lower portion of the plate 94 for maintaining the belt assembly in a preferred orientation. The upper convex projection 122 is located above the mid point of the back part 26 of the seat portion 12 for retaining a reinforcement tube or rod 124 as will be later described. The convex projections also add to the rigidity of the frame 46.

The construction and orientation of the seat portion 12, base portion 14 and restraining assembly 72 is such that when a child is placed in the safety seat 10 with the restraining assembly 72 properly adjusted and latched, the tension exerted by the belt assembly on the child will not vary as a function of the angular orientation of the seat portion with respect to the base portion. This is because the distance between the lower adjustable latch 102 and the pivot rod 54 is fixed independent of the rotation of the seat portion 12 with respect to the base portion 14. Similarly, the distance of the restraining assembly 72 between the pivot rod 54 and the upper latch 82 is, likewise, fixed independent of the angular orientation of the seat portion 12 with respect to base portion 14.

Also located on the pivot rod 54 for rotation thereabout with the remainder of the seat portion 12 is a shaped support tube 126 having a generally inverted U-shaped configuration. The support rod has generally vertical legs 128 secured at their lower ends to the pivot rod 54 for rotation thereabout. The vertical legs 128 extend upwardly through recessed areas 130 of the seat portion 12. The vertical legs 128 are integrally formed with, or otherwise coupled at their upper ends by, a generally horizontal leg 132 extending across the majority of the width of the seat portion. Note particularly FIGS. 4 and 7 through 9. The horizontal leg 132 and the upper ends of the vertical legs 128 are fixedly positioned but spaced from the rear face 18 of the seat portion 12. This allows for a space between the seat portion 12 and U-shaped tube 126 through which the seat belt of the car may pass.

The central part of the horizontal leg 132 is securely coupled to the seat portion 12 through a bracket assembly. Since this general zone of the child safety seat 10 will receive the greatest forces in the event of a sudden stop or turn, collision or other emergency, the seat portion 12 is reinforced with a horizontal tube 124 parallel with the horizontal leg 132 of the U-shaped tube 126. The tube 124 of the seat portion 12 is located interiorly of the frame 46 of the seat portion 12 above its midpoint so that the seat portion 12, rod 124 and horizontal leg 132 are adjacent to each other on opposite sides of the seat portion frame 46 at the upper convex projection 122 for maximum strength. Mating brackets 136 and 138 secure the tube 124 and horizontal leg 132 with respect to each other and the seat portion frame 46 through permanent rivets 140 extending through the brackets 136 and 138 and the frame 46.

Figure 10:
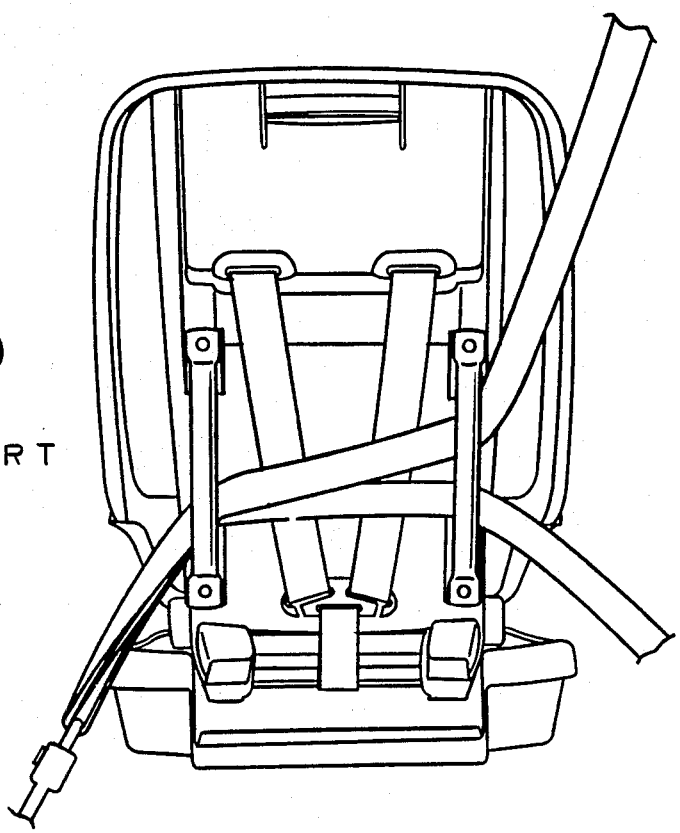
FIG. 10 is a rear elevational view similar to the FIG. 9 showing but illustrating the coupling of a child safety seat with a three-point safety belt in accordance with a known system.

In operation and use, the horizontal lap belt 144 of a three-point seat belt 146 extends in contact with the vertical legs 128 between the vertical legs 128 and the rear face 18 of the seat portion 12. The transverse shoulder belt 148 is positioned in contact with a central extent 150 of the horizontal leg 132 between the horizontal leg 132 and the rear face 18 of the seat portion 12. In this manner, with the U-shaped tube 126 securely coupled to the seat portion 12, a restraining force resisting motion of the child safety seat 10 will be provided at two points below the midpoint of the safety seat 10 and its seat portion 12. A third or single restraining force will also be provided above the midpoint of the safety seat 10 and its seat portion 12. Such an arrangement of three triangularly arranged spaced contact points between the seat belt 146 of the car and the child safety seat 10 will provide for more protection against tipping than was ever previously possible. The location of the seat belt with respect to the safety seat of the present invention may be better appreciated by comparing the showing of the invention in FIG. 9 with the showing of the prior art location as illustrated in FIG. 10. The present invention also allows the safety seat 10 to be located and utilized on either side of a car seat since its parts are symmetric with respect to the seat belt 146 with which it is to be utilized. The arrangement of parts for the child safety seat 10 of the present invention thus provides for maximum safety and convenience of installation in a conventional car with three-point seat belts 146, along with greater comfort than was ever previously possible.

The structure of the subject invention is advantageous in that any load which is transferred from the three-point seat belt 146 to safety seat 10 is dispersed throughout seat portion 12 and base portion 14. This force transfer is affected through U shaped tube 126 and through pivot rod 54. Via pivot rod 54 force loads are transferred through to base portion 14. Further, because vertical legs 128 extend through recess areas 130, any load being applied to vertical legs 128 and horizontal legs 132 is transferred through and evenly dispersed throughout seat sections 12.

The present disclosure includes that information contained in the appended claims as well as that in the foregoing description. Although the invention has been described in its preferred form or embodiment with a certain degree of particularity, it is understood that the present disclosure of the preferred form has been made only by way of example and that numerous changes in the details of construction, fabrication and use including the combination and arrangement of parts, may be resorted to without departing from the spirit and scope of the invention.

Now that the invention has been described,
What is claimed is:

1. A child safety seat for use in association with the seat of a car having a three-point safety belt comprising:
a seat portion;
restraining means operatively coupled with said seat portion for restraining a child in said seat portion; and
retaining means comprising spaced generally vertical lower portions and an intermediate higher portion therebetween positioned in spaced relationship with respect to the rear face of said seat portion and adapted to receive, at the lower generally vertical portions, the horizontal lap belt of the three-point safety belt and, at the intermediate higher portion between the generally vertical portions, the transverse shoulder belt of the three-point safety belt, and means to couple the intermediate higher portion to the back of said seat portion only at a central extent thereof for thereby securely holding said seat portion and child with respect to the seat of a car in which it is utilized.

2. A child safety seat for use in association with the seat of a car having a three-point safety belt comprising:
a seat portion;
restraining means operatively coupled with said seat portion for restraining a child in said seat portion; and
retaining means secured with respect to the rear face of said seat portion in spaced relationship therewith and adapted to receive, at lower generally vertical portions, the horizontal lap belt of the three-point safety belt and, at a higher generally horizontal portion between the generally vertical portions, the transverse shoulder belt of the three-point safety belt for thereby securely holding said seat portion and child with respect to the seat of the car in which it is utilized, said retaining means being formed as an inverted U-shaped member having a horizontal leg and vertical legs coupled at their upper ends with said horizontal leg and also including spacer means coupling the central portion of said horizontal leg with the rear face of said seat portion in spaced relationship whereby a three-point safety belt may be located with its horizontal lap belt in contact with said vertical legs beneath the midpoint of said child safety seat and with its transverse shoulder belt in contact with said horizontal leg above the midpoint of said child safety seat to thereby securely hold said safety seat and child against tipping with respect to the car seat in which it is utilized.

3. The child safety seat as set forth in claim 2 and further including a horizontal support tube secured to the interior face of the frame of said seat portion with said horizontal leg secured to the exterior face of the frame of said seat portion and further including brackets to secure said support tube in parallel relationship with said horizontal leg with the frame of the seat portion therebetween.

4. The child safety seat as set forth in claim 4 and further including bracket means securing said support tube and said horizontal leg with respect to each other and with respect to the frame of said seat portion.

5. The child safety seat as set forth in claim 4 and further including means coupling the lower ends of said vertical legs with respect to the lower extent of said seat portion.

6. A child safety seat for use in association with the seat of a car having a seat belt comprising:
a seat portion;
a base portion;

pivot means coupling said seat portion and said base portion for allowing rotational movement of said seat portion with respect to said base portion about the axis of said pivot means;

restraining means for a child in said seat portion with the upper end of said restraining means releasably coupleable to a forward region of said seat portion and extending upwardly therefrom for contacting the child seated in said seat portion, said restraining means extending around an upper region of said seat portion then downwardly behind the back of said seat portion in contact with and around said pivot means and adjustably coupleable at its lower end to a forward region of said base portion whereby the force of said restraining means on the child in said seat portion will not vary with the angular position of said seat portion with respect to said base portion; and retaining means coupled to said seat portion to secure said seat portion to the seat of the car in which it is utilized through the safety belt of the car.

7. The child safety seat as set forth in claim 6 and further including upper latch means in a forward region of said seat portion for releasably receiving the upper end of said restraining means and a lower latch means in a forward region of said base portion for adjustably receiving the lower end of said restraining means.

8. The child safety seat as set forth in claim 7 wherein said restraining means includes a strap means and a rigid plate, the lower end of which is positionable in said upper latch means for releasably coupling therewith, and the upper end of which is secured to said strap means.

9. The child safety seat as set forth in claim 8 wherein said strap means includes a pair of shoulder straps positionable over the shoulders of a child in said seat portion.

10. The child safety seat as set forth in claim 9 wherein said strap means further includes a single strap coupled at one end to said pair of straps through a plate with the other end of said single strap being receivable by said lower latch.

11. A child safety seat for use in association with the seat of a car having a three-point safety belt comprising:

a seat portion;

a base portion;

pivot means rotatively coupling said seat portion to said base portion for allowing movement of said seat portion with respect to said base portion about the axis of said pivot means;

means locking said seat portion to said base portion in any one of a plurality of angular positions;

restraining means for a child in said seat portion with one end of said restraining means releasably coupleable to a forward region of said seat portion and extending upwardly therefrom for contacting the child seated in said seat portion, said restraining means extending around an upper region of said seat portion and then downwardly behind said seat portion in contact with and around said pivot means and adjustably coupleable to a forward region of said base portion whereby the force of said restraining means on the child will not vary with the position of said seat portion with respect to said base portion;

an inverted U-shaped tube having vertical legs coupled at their lower ends to said pivot means and joined at their upper ends with a horizontal leg; and spacer means coupling the central portion of said horizontal leg with the rear face of said seat portion in spaced relationship whereby a three-point safety belt may be located with its horizontal lap belt in contact with said vertical legs beneath the midpoint of said child safety seat and with its transverse shoulder belt in contact with said horizontal leg above the midpoint of said child safety seat to thereby securely hold said child safety seat with respect to the car seat in which it is utilized.

* * * * *